Dec. 25, 1962    S. KNIGHT ET AL    3,069,789
LANGUAGE LABORATORY
Filed Oct. 13, 1958

INVENTORS
SIDNEY KNIGHT
EDWARD KNIGHT
BY
Robert A. Lloman
ATTORNEY

United States Patent Office
3,069,789
Patented Dec. 25, 1962

3,069,789
LANGUAGE LABORATORY
Sidney Knight and Edward Knight, Detroit, Mich., assignors to Instructomatic, Inc., Detroit, Mich., a corporation of Michigan
Filed Oct. 13, 1958, Ser. No. 766,988
3 Claims. (Cl. 35—35)

This invention relates to language laboratories and more particularly to mechanism for improving teaching and instruction of languages.

It's an object of the present invention in connection with modern language teaching to provide a language laboratory in the form of a room having an instructor's control unit and a series of spaced individual student units, together with a plurality of different lesson channel sources, such as tape playback units, or phono-turntables or the like, whereby with suitable switching mechanism and electrical circuitry an individual lesson source may be connected through instructor's control unit into one or more of the individual student units.

It is another object of the invention to provide a control panel and connected earphones for each student unit whereby he may establish communication with anyone of a plurality of different lesson sources.

It is another object to provide a microphone and amplifier arrangement for each student unit whereby a student may speak and hear what he is saying.

It is a further object to additionally provide a record plug on each control panel whereby a student may periodically plug in a suitable recorder and dictate material or answers or repeat material, and at the same time hear what he is saying.

The advantage of this is that one's own voice is brought vividly to the student's ear, establishing the neuromuscular feedback control, thus permitting the exact reproduction to the student of the sounds to be learned. This also permits close study by the student or for review by instructors. Accordingly, in a multiple position student laboratory, there need only be a limited number of recorders.

It is a further object of the present invention to provide a control panel for the instructor's unit together with earphones and a microphone, and including a listening channel selector switch by which the instructor may selectively listen to each of the individual lesson sources for providing on proper adjustment the correct overall volume therefrom.

It is still a further object to incorporate upon the instructor's control panel a volume level meter for this purpose, whereby the instructor may selectively adjust the volume of the individual sources to the desired classroom standard.

It is a further object of the present invention to provide means of two-way communication between instructor's unit and any of the student units.

It is a further object herein to provide a call switch on each student control panel, and an answer switch on the instructor's panel, together with an audible signal whereby activation of a student's call switch will momentarily energize said audible signal.

It is a further object to incorporate in an instructor's control panel a teacher's monitor switch connected with each of the student units to enable the instructor without detection to listen in on the talking or dictation from any student unit.

These and other objects will be seen from the following specification and claims in conjunction with the appended drawing in which:

It will be understood that the above drawing illustrates merely a preferred embodiment of the invention, and that other embodiments are contemplated within the scope of the claims hereafter set forth.

Figure 1:
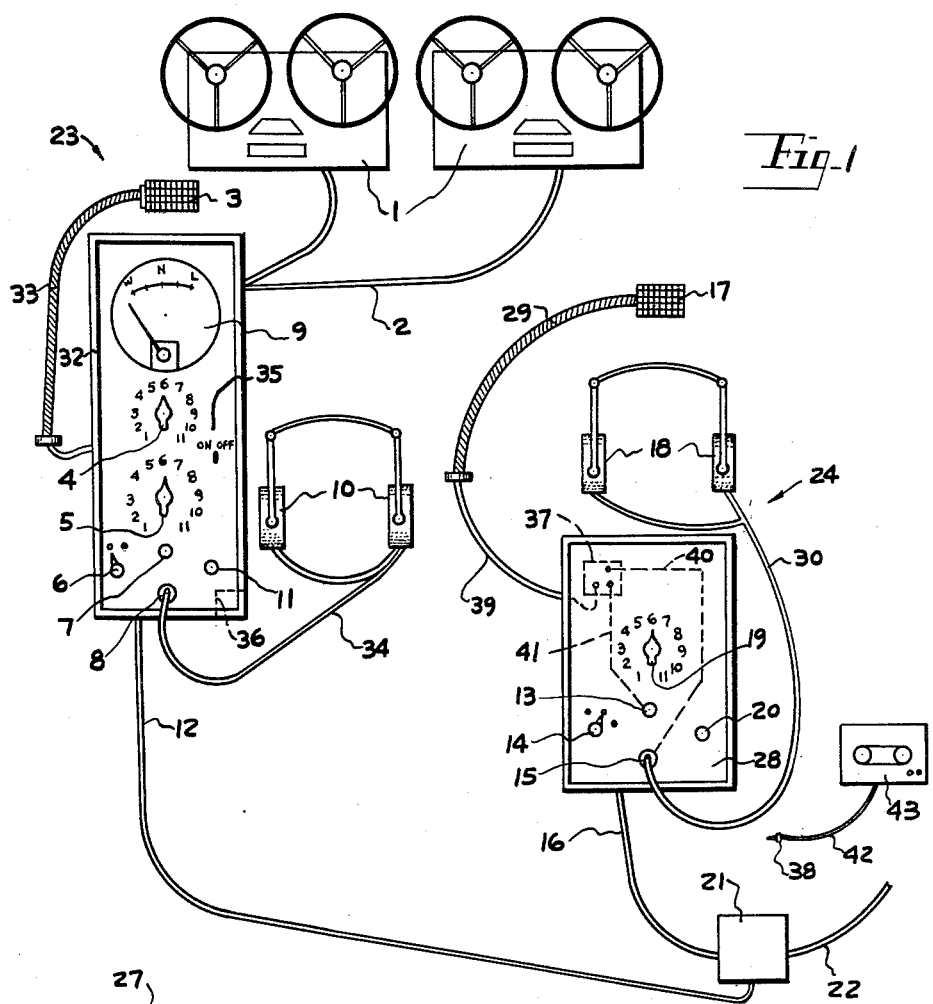
FIG. 1 is a schematic illustration of the instructor's control unit and a student unit forming a part of the present language laboratory.

Referring to the drawing, the instructor's control unit is generally indicated at 23, whereas one of the plurality of student units is generally designated at 24, in FIG. 1.

Figure 2:
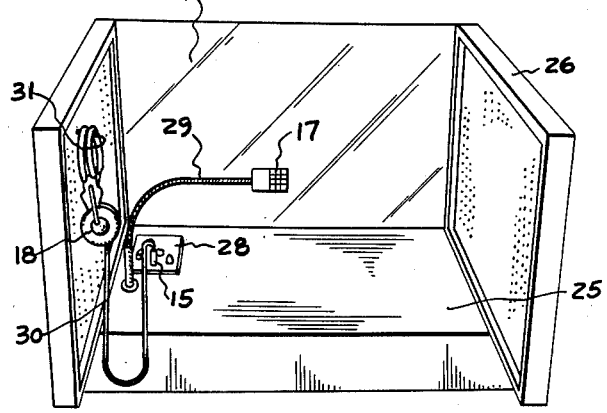
FIG. 2 is a perspective view of a student unit.

Referring to FIG. 2, each student's unit includes an accoustically isolated area having a table 25, a pair of spaced upright accoustical panels 26 upon said table, and an upright glass panel 27 interconnecting the rear ends of said panels. A student is seated in front of and facing the unit, when in use.

Within the work area and upon table 25 there is provided control panel 28 and a suitable gooseneck 29 flexibly supporting student microphone 17. Student earphones 18 have a cord 30 for connection to a suitable earphone jack 15 on control panel 28. When not in use said earphones may be suspended upon panel 26 by bracket 31.

Referring to FIG. 1, there are provided within the room employed for the language laboratory a plurality of individual and different lesson channel sources[1] shown diagrammatically. These may be tape playback units, phono-turntables, radio tuners, sound projectors, audio slide projectors or a combination thereof. Each of these sources are individually connected to the instructor's control panel 32 by wiring 2.

Main distribution cable 12 joins control panel 32 and is connected to each of the lesson sources for transmission to junction box 21, which is in the nature of a color coded junction box for conveniently hooking up the present system. Distribution cable 16 interconnects junction box 21 with control panel 28 of one student unit 24, for illustration. The additional main distribution cable 22 provides means of establishing further connections between said junction box and other student units identical to student unit 24, one of which is hereafter described in detail.

The instructor's control unit has connected to control panel 32 a flexible gooseneck 33 carrying microphone 3.

A suitable lesson channel selector 5 is mounted on panel 32 and has a series of positions of adjustment whereby the instructor may establish communication between his unit and any of the individual lesson sources. In this connection earphones 10 are provided with suitable wiring 34 to earphone jack 8 in control panel 32 by which the instructor may listen to any pre-selected lesson source.

By this construction the instructor may pre-set the intensity or sound level for each individual lesson source by suitable manual adjustment at the particular source, and thus may evenly balance the volume of all channels.

Facilitating this, control panel 32 includes therein volume level meter 9 of a conventional construction with a suitable needle for indicating "weak," "normal" and "loud," thus providing a visual means of determining the volume of any particular source and for making a particular adjustment.

Master switch 7 on panel 32 powers the entire system, including the teacher's unit and all student units.

Panel 32 also has thereon an answer switch 6, which has two positions, the one at the left for example being student communication position and the one at the right the channel connection position.

For example, when the instructor wishes to connect his earphones with a particular lesson source, he first throws the answer switch 6 to the right hand position for example, and selects any lesson source by operating channel selector 5.

Control panel 32 also has thereon an instructor's monitor switch 4 which is selectively adjustable for connection with each of the respective student units 24, whereby the instructor may monitor any student at will without detection for confidential observance of the student lesson. In this connection, there is provided upon panel 32 a suitable "off" and "on" switch 35. Accordingly earphones 10 may be employed for overseeing students oral work or dictation as desired.

Also mounted upon control panel 32 is a teacher's volume control 11 incorporating a suitable rheostat or other conventional apparatus for regulating volume for the teacher's earphones only. A suitable audible signal device, such as a buzzer 36, is connected with panel 32, providing a means whereby a particular student may signal the instructor for two-way communication in the following manner. Student activates call switch 14 energizing buzzer 36. The instructor activates his answer switch 6 turning the same to the "left" or to "student" position.

Communication, however, between the instructor and the individual student is not established until the student has adjusted his call switch 14 on control panel 28 to the intermediate position shown, for illustration.

Said call switch actually has three positions, i.e., a left hand "lesson" position which connects the student's earphones 18 directly to his own microphone 17, associated amplifier 37, and his lesson channel selector 19.

The intermediate position is the "talk" position, which disconnects the above mentioned circuitry and permits student to hold a two-way conversation with the instructor, after he opens his communication circuit by answer switch 6.

The third position on the student call switch 14 has a spring tension acting so that upon manual release said switch automatically returns to the intermediate "talk" position. Said third signal position on "call" switch 14 establishes electrical connection to buzzer 36 on instructor's panel 32.

Primarily the student control panel 28 has an earphone jack 15 by which earphones 18 through wire 30 may be plugged therein.

Mounted upon panel 28 is a student lesson channel selector 19 having a series of selectively adjustable positions connected with the individual lesson sources whereby the student may select the desired lesson channel to listen to employing earphones 18.

Microphone 17 with flexible gooseneck 29 is also provided for the student as above described in connection with FIG. 2 and by suitable wiring 39 joins amplifier 37 shown in dotted lines, which in turn is connected by suitable circuitry 40 to earphone jack 15.

Amplifier 37 is also connected as at 41 to record plug 13 in panel 28 into which the student may selectively insert the connector 38 and cord 42 on any portable tape recorder 43 or the like.

By this construction, the student may dictate directly to tape recorder 43 using microphone 17, and use his earphones 18 in order to hear himself "talk." Said earphones are also used to hear the teacher through the proper communicating channels above described, or to hear the desired lesson channel upon activation of channel selector switch 19.

The student control panel 28 also includes an individual student volume control rheostat or like device 20 permitting the student to raise or lower the volume on his earphones only.

The student may talk into his microphone and merely hear himself talk.

As desired, the student may make recordings of selected programs or of student assignments using the portable tape recorder 43. However, this tape recorder is available to other student units for connection as desired.

The present language laboratory provides the best and most practical means of securing the listening acuity, oral accuracy, and spontaneous fluency which are high on the list of present day objections in modern language teaching.

In the present language laboratory one or more of the following activities necessary for language learning can be carried on: i.e.

(1) Listening to example, materials.

(2) Repeating example materials and hearing back what is repeated.

(3) Recording the speech of students.

(4) Viewing pictorial materials which help provide an insight of what is said and heard.

One of the important factors is that the student hears what is said in his earphones as he says it. Each student works privately in an "invisible room." His earphones are cut off from the outside noise so he may confine his attention to the incoming lesson and thus concentrate without regard to surrounding activity or other students.

Hearing his own voice so vividly through the microphone amplifier and earphone arrangement, the student has the illusion of greater power and "bounce." Each breath and whisper is so clearly audible that he can shape his sounds to the proper tone "tune" and accent.

This is possible employing transistorized amplifiers and microphone-earphone circuits in the present language laboratory.

Having described our invention, reference should now be had to the following claims.

We claim:

1. In a language laboratory, an instructor's control unit, a plurality of different lesson channel sources connected thereto, a plurality of spaced individual student units spaced from said control unit, a junction box, a main distributor cable interconnecting said control unit with said junction box, a series of individual distribution cables respectively interconnecting said junction box with each student unit, each student unit consisting of an acoustically isolated work area, a control panel therein, earphones plugged into said panel, a manual lesson channel selector on said control panel connected to and having positions of adjustment corresponding to each of said channel sources for establishing selective communication between said sources and said earphones, a student microphone joined to said control panel, an amplifier in said panel interconnecting said microphone with said earphones, whereby a student may hear his own voice while talking into said microphone, a manual call switch on said panel having a first control position for connecting student's earphones directly to his listening channel selector, said instructor's control unit including a control panel, an audible signal means thereon, said student's call switch having a second control position connected with said audible signal means whereby a student at will may activate said audible signal means, earphones plugged into instructor's control panel, a microphone connected to instructor's control panel, and an answer switch on instructor's control panel, said call switch having a third control position connected with said answer switch for providing two-way communication between instructor's unit and a student's unit.

2. In a language laboratory of claim 1, the instructor's control unit including a teacher's monitor switch thereon connected to and having positions of adjustment corresponding to each of said student units for establishing selective connection between a student unit and instructor's earphones.

3. In a language laboratory of claim 1, the instructor's control unit including a teacher's monitor switch thereon connected to and having positions of adjustment corresponding to each of said student units for establishing selective connection between a student unit and instructor's earphones, a lesson channel selector connected to and having positions corresponding to each of said lesson sources for establishing selective communication between said sources and instructor's earphones, said answer switch movable to a second position to complete the connection between instructor's control unit and a selected lesson source.

References Cited in the file of this patent

UNITED STATES PATENTS

| | | |
|---|---|---|
| 2,320,726 | Herckman | June 1, 1943 |
| 2,699,466 | Kobler | Jan. 11, 1955 |
| 2,777,901 | Dostert | Jan. 15, 1957 |
| 2,798,172 | Jones | July 2, 1957 |
| 2,876,561 | Horne | Mar. 10, 1959 |

FOREIGN PATENTS

| | | |
|---|---|---|
| 766,434 | Great Britain | Jan. 23, 1957 |

OTHER REFERENCES

Pamphlet citing: "The Washington Post,, (newspaper), dated Nov. 22, 1950 (3 pages), article entitled: "Electronic Language Teaching System Starts at Georgetown University."

Audio-Visual Equipment Directory, 1956 edition, National Audio-Visual Ass'n, p. 129 (pertains to features of MRI Magneticon Synchro ML-66 Dual Tape–Magnetic Disk Recorder-Reproducer).

Heath (pamphlet): "A Language Laboratory Handbook and Directory For 1956," pages 17, 24–26, 32 only need be ordered.

Marty (brochure): "Methods and equipment for the Language Laboratory" (copyright 1956—Audio-Visual Publications, Middlebury, Vt.), pages 20–26 only need be ordered.

Textbook: Acoustical Engineering, by Harry F. Olson, copyright 1957, D. Van Nostrand Co., N.Y., pages 532 and 533, article: Intercommunicating Systems. (Copy in Div. 16; Tech. Lib. Call No.: TK–5981–05—1957.)

Bulletin 1959, No. 3 (U.S. Department of Health, Education and Welfare): "Foreign Language Labs. in Schools and Colleges," pages 21, 22, 62, 63 and 64.

Newspaper article: The Sunday Star, Washington, D.C., Aug. 23, 1959 (The Star Magazine), pages 68 and 69, "Teaching by Tape."